(12) United States Patent
Jeng et al.

(10) Patent No.: US 11,845,883 B2
(45) Date of Patent: Dec. 19, 2023

(54) DOUBLE-SIDED OPTICALLY CLEAR ADHESIVE AND MULTILAYER STRUCTURE INCLUDING THE SAME

(71) Applicant: INDUSTRIAL TECHNOLOGY RESEARCH INSTITUTE, Hsinchu (TW)

(72) Inventors: Jauder Jeng, Zhudong Township (TW); Hsien-Kuang Lin, Hsinchu (TW); Ming-Hsueh Chiang, Kaohsiung (TW); Tien-Shou Shieh, Hsinchu (TW); Chi-Fu Tseng, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/830,698

(22) Filed: Jun. 2, 2022

(65) Prior Publication Data
US 2023/0212438 A1    Jul. 6, 2023

(30) Foreign Application Priority Data
Dec. 30, 2021    (TW) .................................. 110149732

(51) Int. Cl.
| C09J 133/08 | (2006.01) |
| C09J 7/29 | (2018.01) |
| C09J 133/10 | (2006.01) |
| C09J 133/20 | (2006.01) |
| C09J 133/26 | (2006.01) |
| C09J 139/06 | (2006.01) |
| B32B 37/12 | (2006.01) |
| C09J 7/38 | (2018.01) |
| B32B 17/10 | (2006.01) |

(52) U.S. Cl.
CPC ....... *C09J 133/08* (2013.01); *B32B 17/10458* (2013.01); *B32B 37/1284* (2013.01); *C09J 7/29* (2018.01); *C09J 7/38* (2018.01); *C09J 133/10* (2013.01); *C09J 133/20* (2013.01); *C09J 133/26* (2013.01); *C09J 139/06* (2013.01); *B32B 2307/412* (2013.01); *B32B 2307/42* (2013.01); *B32B 2457/202* (2013.01); *B32B 2551/00* (2013.01); *C09J 2203/318* (2013.01); *C09J 2301/124* (2020.08); *Y10T 428/2848* (2015.01); *Y10T 428/2891* (2015.01)

(58) Field of Classification Search
None
See application file for complete search history.

(56) References Cited

U.S. PATENT DOCUMENTS

| 6,646,050 | B2 * | 11/2003 | Ohrui ................... C08G 18/289 525/123 |
| 9,606,391 | B2 | 3/2017 | Oohira |
| 10,310,333 | B2 | 6/2019 | Yasui et al. |
| 10,353,230 | B2 | 7/2019 | Jung et al. |
| 10,471,681 | B2 | 11/2019 | Tapio et al. |
| 10,479,912 | B2 | 11/2019 | Kim et al. |
| 2003/0232192 | A1 | 12/2003 | Kishioka et al. |
| 2004/0191509 | A1 | 9/2004 | Kishioka et al. |
| 2013/0241862 | A1 | 9/2013 | Kim et al. |
| 2015/0267089 | A1 * | 9/2015 | Niimi ..................... C09J 133/08 345/173 |
| 2017/0002237 | A1 * | 1/2017 | Cho ....................... C09J 133/08 |
| 2017/0198170 | A1 * | 7/2017 | Clapper .................. G02B 5/00 |

FOREIGN PATENT DOCUMENTS

| CN | 103170491 A | 6/2013 |
| CN | 104635987 A | 5/2015 |
| CN | 105143378 A | 12/2015 |
| CN | 103998549 B | 10/2016 |
| CN | 107225840 A | 10/2017 |
| CN | 207408924 U | 5/2018 |
| JP | 2019218455 A * | 12/2019 |
| TW | I495705 B | 8/2015 |
| TW | 201741833 A | 12/2017 |
| WO | WO 2014/130507-1 | 8/2014 |

OTHER PUBLICATIONS

Miyake, Masaya et al., "Optically Clear Adhesive Sheet, Laminate, And Bonded Structure", machine transaltion of JP 219218455 A, Dec. 26, 2019 (Year: 2019).*
"Carboxylic acid", Britannica Online Encyclopedia, pp. 1-3, retrived on Sep. 18, 2023 (Year: 2023).*
Taiwanese Office Action and Search Report for corresponding Taiwanese Application No. 110149732, dated Jun. 27, 2022.

* cited by examiner

*Primary Examiner* — Anish P Desai
(74) *Attorney, Agent, or Firm* — Birch, Stewart, Kolasch & Birch, LLP

(57) ABSTRACT

A double-sided optically clear adhesive is provided. The double-sided optically clear adhesive includes a first adhesive layer and a second adhesive layer. The first adhesive layer includes a first resin and a first thermal-crosslinking agent. The first resin includes a hydroxyl group. The first thermal-crosslinking agent includes a first group. The second adhesive layer includes a second resin and a second thermal-crosslinking agent. The second resin includes a hydroxyl group. The second thermal-crosslinking agent includes a second group. The ratio of the equivalent number of the first group of the first thermal-crosslinking agent to the equivalent number of the hydroxyl group of the first resin is represented by r1. The ratio of the equivalent number of the second group of the second thermal-crosslinking agent to the equivalent number of the hydroxyl group of the second resin is represented by r2, wherein $r1 < r2 \leq 0.8$ and $r2 - r1 \geq 0.025$.

13 Claims, 1 Drawing Sheet

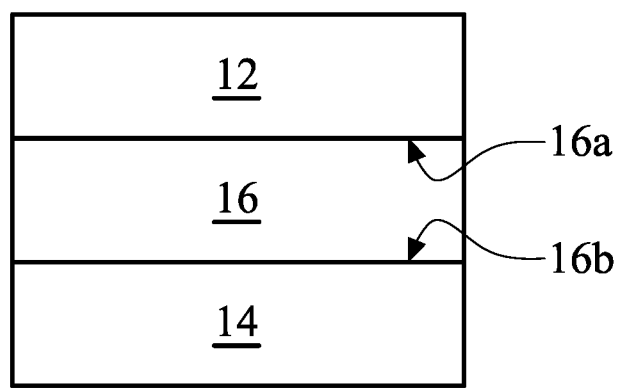

DOUBLE-SIDED OPTICALLY CLEAR ADHESIVE AND MULTILAYER STRUCTURE INCLUDING THE SAME

CROSS REFERENCE TO RELATED APPLICATIONS

This application claims priority of Taiwan Patent Application No. 110149732, filed on Dec. 30, 2021, the entirety of which is incorporated by reference herein.

TECHNICAL FIELD

The present disclosure relates to a double-sided optically clear adhesive, and more particularly to a freeze-peelable double-sided optically clear adhesive.

BACKGROUND

The touch technology used in existing touch displays includes the use of an optically clear adhesive to bond and fix a cover plate and a touch panel of a touch display, and the use of an optically clear adhesive to bond and fix a touch panel and a polarizer of a display module. In order to avoid the peeling of the two adhered panels, the existing optically-clear-adhesive products mostly emphasize their strong adhesive force, but the characteristics of strong adhesion also mean that it is not easy to do a rework.

The panel-rework process in a panel factory is mainly divided into two types. One is to treat panels at low temperatures, and then peel off the two panels that are adhered by an optically clear adhesive. The other is to use a machine to cut the optically clear adhesive, and then peel off the two panels. However, since part of the optically clear adhesive is adhered on both of the two panels in the two methods, both of these methods require a lot of manpower and use a lot of solvents to remove the residual adhesive, which is time-consuming and not environmentally friendly. Also, the polarizer is easily damaged in the process of removing the residual adhesive.

SUMMARY

In accordance with one embodiment of the present disclosure, a double-sided optically clear adhesive is provided. The double-sided optically clear adhesive includes a first adhesive layer and a second adhesive layer. The first adhesive layer includes a first resin and a first thermal-crosslinking agent. The first resin includes a hydroxyl group. The first thermal-crosslinking agent includes a first group capable of reacting with the hydroxyl group of the first resin. The second adhesive layer includes a second resin and a second thermal-crosslinking agent. The second resin includes a hydroxyl group. The second thermal-crosslinking agent includes a second group capable of reacting with the hydroxyl group of the second resin. The ratio of the equivalent number of the first group of the first thermal-crosslinking agent to the equivalent number of the hydroxyl group of the first resin is represented by r1. The ratio of the equivalent number of the second group of the second thermal-crosslinking agent to the equivalent number of the hydroxyl group of the second resin is represented by r2, wherein $r1 < r2 \leq 0.8$ and $r2 - r1 \geq 0.025$.

In accordance with one embodiment of the present disclosure, a multilayer structure is provided. The multilayer structure includes a first substrate, a second substrate, and the disclosed double-sided optically clear adhesive. The first adhesive layer has a first surface. The second adhesive layer has a second surface. The first surface is in contact with the first substrate. The second surface is in contact with the second substrate.

A detailed description is given in the following embodiments with reference to the accompanying drawings.

BRIEF DESCRIPTION OF THE DRAWINGS

FIGURE is a cross-sectional view of a multilayer structure in accordance with one embodiment of the present disclosure.

DETAILED DESCRIPTION

The present disclosure provides a double-sided optically clear adhesive whose surface peel adhesion is differentiated after a low-temperature treatment. The double-sided optically clear adhesive is used to assemble a touch display, which at least includes a first surface and a second surface. The first surface and the second surface are respectively used for adhering and fixing a touch panel and a polarizer of a display module. After the optically clear adhesive is treated at low temperature, the adhesive force of the first surface and the second surface of the double-sided optically clear adhesive is greatly reduced, and after the sharp drop, the adhesion between the two surfaces is different. Therefore, in addition to easily peeling off the two adhered panels, the double-sided optically clear adhesive of the present disclosure will not remain on the two panels at the same time, and more inclined not to remain on polarizer.

In accordance with one embodiment of the present disclosure, a double-sided optically clear adhesive is provided. The double-sided optically clear adhesive includes a first adhesive layer and a second adhesive layer. The first adhesive layer includes a first resin and a first thermal-crosslinking agent. The first resin includes a hydroxyl group. The first thermal-crosslinking agent includes a first group capable of reacting with the hydroxyl group of the first resin. The ratio of the equivalent number of the first group of the first thermal-crosslinking agent to the equivalent number of the hydroxyl group of the first resin is represented by r1. The second adhesive layer includes a second resin and a second thermal-crosslinking agent. The second resin includes a hydroxyl group. The second thermal-crosslinking agent includes a second group capable of reacting with the hydroxyl group of the second resin. The ratio of the equivalent number of the second group of the second thermal-crosslinking agent to the equivalent number of the hydroxyl group of the second resin is represented by r2. Specifically, r1 and r2 meet the following numerical conditions: $r1 < r2 \leq 0.8$ and $r2 - r1 \geq 0.025$.

In some embodiments, the monomer composition of the first resin may include a hydroxyl group-containing monomer, a hydroxyl group-free hydrophilic monomer, and a (meth)acrylic acid alkyl ester monomer. In some embodiments, the carbon number of the alkyl groups in the (meth)acrylic acid alkyl ester monomer is greater than or equal to about 3 and less than or equal to about 12. In some embodiments, in the first resin, the hydroxyl group-containing monomer has about 1 to 10 parts by weight, the hydroxyl group-free hydrophilic monomer has about 1 to 20 parts by weight, and the (meth)acrylic acid alkyl ester monomer has about 75 to 95 parts by weight, based on 100 parts by weight of the total weight of the monomers in the first resin.

In some embodiments, the monomer composition of the second resin may include a hydroxyl group-containing monomer, a hydroxyl group-free hydrophilic monomer, and a (meth)acrylic acid alkyl ester monomer. In some embodiments, the carbon number of the alkyl groups in the (meth) acrylic acid alkyl ester monomer is greater than or equal to about 3 and less than or equal to about 12. In some embodiments, in the second resin, the hydroxyl group-containing monomer has about 1 to 10 parts by weight, the hydroxyl group-free hydrophilic monomer has about 1 to 20 parts by weight, and the (meth)acrylic acid alkyl ester monomer has about 75 to 95 parts by weight, based on 100 parts by weight of the total weight of the monomers in the second resin.

In some embodiments, the hydroxyl group-containing monomer may include acrylic acid, hydroxyethyl (meth) acrylate, hydroxypropyl (meth)acrylate, or hydroxybutyl (meth)acrylate.

In some embodiments, the hydroxyl group-free hydrophilic monomer may include acrylonitrile, acrylamide, acryloyl morpholine, or N-vinyl-2-pyrrolidone.

In some embodiments, the first resin and the second resin have the same monomer composition. In some embodiments, the first resin and the second resin have different monomer compositions.

In some embodiments, the first group and the second group may include isocyanate groups, carboxyl groups, aziridine groups, anhydride groups, or melamine groups.

Referring to FIG. 1, in accordance with one embodiment of the present disclosure, a multilayer structure 10 is provided. FIG. 1 is the cross-sectional view of the multilayer structure 10.

As shown in FIG. 1, the multilayer structure 10 includes a first substrate 12, a second substrate 14, and a double-sided optically clear adhesive 16. The double-sided optically clear adhesive 16 has a first surface 16a and a second surface 16b opposite to the first surface 16a. The first surface 16a of the double-sided optically clear adhesive 16 is in contact with the first substrate 12. The second surface 16b of the double-sided optically clear adhesive 16 is in contact with the second substrate 14. The double-sided optically clear adhesive 16 includes a resin and a thermal-crosslinking agent. The resin includes a hydroxyl group. The thermal-crosslinking agent includes a group capable of reacting with the hydroxyl group. On the first surface 16a of the double-sided optically clear adhesive 16, the ratio of the equivalent number of the group of the thermal-crosslinking agent to the equivalent number of the hydroxyl group of the resin is represented by r. On the second surface 16b of the double-sided optically clear adhesive 16, the ratio of the equivalent number of the group of the thermal-crosslinking agent to the equivalent number of the hydroxyl group of the resin is represented by r2. Specifically, r1 and r2 meet the following numerical conditions: $r1 < r2 \leq 0.8$ and $r2 - r1 \geq 0.025$.

In some embodiments, the first substrate 12 may include a panel, such as a touch panel, but the present disclosure is not limited thereto. Other suitable components, such as a glass of a solar module or an upper glass of a liquid crystal cell, may also be used as the first substrate 12. In some embodiments, the panel may include transparent glass or a transparent substrate, and at least one surface of the transparent glass or the transparent substrate may include transparent conductive electrodes.

In some embodiments, the second substrate 14 may include a polarizer, but the present disclosure is not limited thereto. Other suitable components, such as a backplate of a solar module or a lower glass of a liquid crystal cell, may also be used as the second substrate 14.

In some embodiments, the monomer composition of the resin may include a hydroxyl group-containing monomer, a hydroxyl group-free hydrophilic monomer, and a (meth) acrylic acid alkyl ester monomer. In some embodiments, the carbon number of the alkyl groups in the (meth)acrylic acid alkyl ester monomer is greater than or equal to about 3 and less than or equal to about 12. In some embodiments, in the resin, the hydroxyl group-containing monomer has about 1 to 10 parts by weight, the hydroxyl group-free hydrophilic monomer has about 1 to 20 parts by weight, and the (meth)acrylic acid alkyl ester monomer has about 75 to 95 parts by weight, based on 100 parts by weight of the total weight of the monomers in the resin.

In some embodiments, the hydroxyl group-containing monomer may include acrylic acid, hydroxyethyl (meth) acrylate, hydroxypropyl (meth)acrylate, or hydroxybutyl (meth)acrylate.

In some embodiments, the hydroxyl group-free hydrophilic monomer may include acrylonitrile, acrylamide, acryloyl morpholine, or N-vinyl-2-pyrrolidone.

In some embodiments, the group may include isocyanate groups, carboxyl groups, aziridine groups, anhydride groups, or melamine groups.

In some embodiments, when the multilayer structure 10 is treated at a temperature of about −20° C. to about −130° C. and a time of about 1 minute to about 1 hour, the peel adhesions of the first surface 16a and the second surface 16b of the adhesive layer 16 is represented by PA1 and PA2, respectively. Specifically, PA1 and PA2 meet the following numerical conditions: PA1>PA2.

Synthesis Example 1

Synthesis of Resin A

A set of four-neck reaction flask was assembled. The four-neck reaction flask was equipped with a thermometer, a condenser, an agitator, and a heater. The temperature of the condensate in the condenser was maintained at −15° C. Toluene was used as a solvent. 205.31 g of solvent was added to the four-neck reaction flask, and the four-neck reaction flask was purged with nitrogen. The agitation rate of 200 rpm was maintained. The temperature of the solvent was then increased and maintained at 85° C. A clear mixed solution containing 95.35 g of toluene, 11.53 g of acrylic acid, 74.28 g of acrylonitrile, 312.73 g of butyl acrylate, and 1.99 g of azobisisobutyronitrile as an initiator was added to the four-neck reaction flask and reacted. The reaction time continued for 16 hours, and the resin A solution with a solid content of 57.1 wt % was obtained.

Synthesis Example 2

Synthesis of Resin B

A set of four-neck reaction flask was assembled. The four-neck reaction flask was equipped with a thermometer, a condenser, an agitator, and a heater. The temperature of the condensate in the condenser was maintained at −15° C. Toluene was used as a solvent. 253.17 g of solvent was added to the four-neck reaction flask, and the four-neck reaction flask was purged with nitrogen. The agitation rate of 200 rpm was maintained. The temperature of the solvent was then increased and maintained at 85° C. A clear mixed solution containing 117.57 g of toluene, 26.03 g of hydroxypropyl acrylate, 14.22 g of acrylamide, 66.68 g of N-vinyl-2-pyrrolidone, 384.51 g of butyl acrylate, and 2.46 g of azobisisobutyronitrile as an initiator was added to the four-neck reaction flask and reacted. The reaction time continued for 16 hours, and the resin B solution with a solid content of 57.1 wt % was obtained.

Synthesis Example 3

Synthesis of Resin C

A set of four-neck reaction flask was assembled. The four-neck reaction flask was equipped with a thermometer, a condenser, an agitator, and a heater. The temperature of the condensate in the condenser was maintained at −15° C. Toluene was used as a solvent. 255.53 g of solvent was added to the four-neck reaction flask, and the four-neck reaction flask was purged with nitrogen. The agitation rate of 200 rpm was maintained. The temperature of the solvent was then increased and maintained at 85° C. A clear mixed solution containing 118.67 g of toluene, 11.67 g of hydroxyethyl acrylate, 14.42 g of hydroxybutyl acrylate, 28.43 g of acrylamide. 62.11 g of acryloyl morpholine, 379.38 g of butyl acrylate, and 2.48 g of azobisisobutyronitrile as an initiator was added to the four-neck reaction flask and reacted. The reaction time continued for 16 hours, and the resin C solution with a solid content of 57.1 wt % was obtained.

Synthesis Example 4

Synthesis of Resin D

A set of four-neck reaction flask was assembled. The four-neck reaction flask was equipped with a thermometer, a condenser, an agitator, and a heater. The temperature of the condensate in the condenser was maintained at −15° C. Toluene was used as a solvent. 253.35 g of solvent was added to the four-neck reaction flask, and the four-neck reaction flask was purged with nitrogen. The agitation rate of 200 rpm was maintained. The temperature of the solvent was then increased and maintained at 85° C. A clear mixed solution containing 117.66 g of toluene, 26.03 g of hydroxypropyl acrylate, 6.37 g of acrylonitrile. 80.02 g of N-vinyl-2-pyrrolidone, 379.38 g of butyl acrylate, and 4.75 g of azobisisobutyronitrile as an initiator was added to the four-neck reaction flask and reacted. The reaction time continued for 16 hours, and the resin D solution with a solid content of 57.2 wt % was obtained.

Synthesis Example 5

Synthesis of Resin E

A set of four-neck reaction flask was assembled. The four-neck reaction flask was equipped with a thermometer, a condenser, an agitator, and a heater. The temperature of the condensate in the condenser was maintained at −15° C. Toluene was used as a solvent. 260.28 g of solvent was added to the four-neck reaction flask, and the four-neck reaction flask was filled with nitrogen. The agitation rate of 200 rpm was maintained. The temperature of the solvent was then increased and maintained at 85° C. A clear mixed solution containing 120.87 g of toluene, 20.82 g of hydroxypropyl acrylate, 10.61 g of acrylonitrile, 79.06 g of acryloyl morpholine, 394.76 g of butyl acrylate, and 10.96 g of azobisisobutyronitrile as an initiator was added to the four-neck reaction flask and reacted. The reaction time continued for 16 hours, and the resin E solution with a solid content of 57.5 wt % was obtained.

Preparation Example 1

Preparation of Adhesive Solution a1 (Using Resin A)

0.1 g of dibutyltin dilaurate was mixed with 10 g of toluene to prepare a 1 wt % of dibutyltin dilaurate solution. 1 g of hexamethylene diisocyanate (HMDI) as a thermal-crosslinking agent was mixed with 9 g of toluene to prepare a 10 wt % HMDI solution. In addition, 175.06 g of resin A solution and 103 g of toluene were mixed, and after fully stirring and mixing, 0.83 g of the above-mentioned HMDI solution (the ratio of equivalent numbers for NCO to OH was 0.025) and 0.25 g of the above-mentioned dibutyltin dilaurate solution were added and stirred for another 30 minutes to fully mix into a clear and transparent mixed solution. So far, the adhesive solution a1 with a solid content of 35.9 wt % was prepared.

Preparation Example 2

Preparation of Adhesive Solution a2 (Using Resin A)

The adhesive solution a2 was prepared using the method of preparing the adhesive solution a1 in Preparation Example 1, wherein 1.66 g of a HMDI solution (the ratio of equivalent numbers for NCO to OH was 0.049) was added. The adhesive solution a2 with a solid content of 35.8 wt % was prepared.

Preparation Example 3

Preparation of Adhesive Solution a3 (Using Resin A)

The adhesive solution a3 was prepared using the method of preparing the adhesive solution a1 in Preparation Example 1, wherein 2.49 g of a HMDI solution (the ratio of equivalent numbers for NCO to OH was 0.074) was added. The adhesive solution a3 with a solid content of 35.7 wt % was prepared.

Preparation Example 4

Preparation of Adhesive Solution b1 (Using Resin B)

0.1 g of dibutyltin dilaurate was mixed with 10 g of toluene to prepare a 1 wt % of dibutyltin dilaurate solution. 1 g of hexamethylene diisocyanate (HMDI) as a thermal-crosslinking agent was mixed with 9 g of toluene to prepare a 10 wt % HMDI solution. In addition, 175.06 g of resin B solution and 103 g of toluene were mixed, and after fully stirring and mixing, 0.83 g of the above-mentioned HMDI solution (the ratio of equivalent numbers for NCO to OH was 0.024) and 0.25 g of the above-mentioned dibutyltin dilaurate solution were added and stirred for another 30 minutes to fully mix into a clear and transparent mixed solution. So far, the adhesive solution b1 with a solid content of 35.9 wt % was prepared.

Preparation Example 5

Preparation of Adhesive Solution b2 (Using Resin B)

The adhesive solution b2 was prepared using the method of preparing the adhesive solution b1 in Preparation Example 4, wherein 1.78 g of a HMDI solution (the ratio of equivalent numbers for NCO to OH was 0.052) was added. The adhesive solution b2 with a solid content of 35.8 wt % was prepared.

Preparation Example 6

Preparation of Adhesive Solution b3 (Using Resin B)

The adhesive solution b3 was prepared using the method of preparing the adhesive solution b1 in Preparation Example 4, wherein 2.60 g of a HMDI solution (the ratio of equivalent numbers for NCO to OH was 0.076) was added. The adhesive solution b3 with a solid content of 35.7 wt % was prepared.

Preparation Example 7

Preparation of Adhesive Solution c1 (Using Resin C)

0. Ig of dibutyltin dilaurate was mixed with 10 g of toluene to prepare a 1 wt % of dibutyltin dilaurate solution. 1 g of hexamethylene diisocyanate (HMDI) as a thermal-crosslinking agent was mixed with 9 g of toluene to prepare a 10 wt % HMDI solution. In addition, 175.06 g of resin C solution and 103 g of toluene were mixed, and after fully stirring and mixing, 0.88 g of the above-mentioned HMDI solution (the ratio of equivalent numbers for NCO to OH was 0.026) and 0.25 g of the above-mentioned dibutyltin dilaurate solution were added and stirred for another 30 minutes to fully mix into a clear and transparent mixed solution. So far, the adhesive solution c1 with a solid content of 35.9 wt % was prepared.

Preparation Example 8

Preparation of Adhesive Solution c2 (Using Resin C)

The adhesive solution c2 was prepared using the method of preparing the adhesive solution c1 in Preparation Example 7, wherein 1.70 g of a HMDI solution (the ratio of equivalent numbers for NCO to OH was 0.050) was added. The adhesive solution c2 with a solid content of 35.8 wt % was prepared.

Preparation Example 9

Preparation of Adhesive Solution c3 (Using Resin C)

The adhesive solution c3 was prepared using the method of preparing the adhesive solution c1 in Preparation Example 7, wherein 2.55 g of a HMDI solution (the ratio of equivalent numbers for NCO to OH was 0.076) was added. The adhesive solution c3 with a solid content of 35.7 wt % was prepared.

Preparation Example 10

Preparation of Adhesive Solution d1 (Using Resin D)

0.1 g of dibutyltin dilaurate was mixed with 10 g of toluene to prepare a 1 wt % of dibutyltin dilaurate solution. 1 g of hexamethylene diisocyanate (HMDI) as a thermal-crosslinking agent was mixed with 9 g of toluene to prepare a 10 wt % HMDI solution. In addition, 174.72 g of resin D solution and 103 g of toluene were mixed, and after fully stirring and mixing, 4.46 g of the above-mentioned HMDI solution (the ratio of equivalent numbers for NCO to OH was 0.132) and 0.25 g of the above-mentioned dibutyltin dilaurate solution were added and stirred for another 30 minutes to fully mix into a clear and transparent mixed solution. So far, the adhesive solution d1 with a solid content of 35.6 wt % was prepared.

Preparation Example 11

Preparation of Adhesive Solution d2 (Using Resin D)

The adhesive solution d2 was prepared using the method of preparing the adhesive solution d1 in Preparation Example 10, wherein 4.98 g of a HMDI solution (the ratio of equivalent numbers of for NCO to OH was 0.147) was added. The adhesive solution d2 with a solid content of 35.5 wt % was prepared.

Preparation Example 12

Preparation of Adhesive Solution d3 (Using Resin D)

The adhesive solution d3 was prepared using the method of preparing the adhesive solution d1 in Preparation Example 10, wherein 5.85 g of a HMDI solution (the ratio of equivalent numbers for NCO to OH was 0.173) was added. The adhesive solution d3 with a solid content of 35.4 wt % was prepared.

Preparation Example 13

Preparation of Adhesive Solution e1 (Using Resin E)

0.1 g of dibutyltin dilaurate was mixed with 10 g of toluene to prepare a 1 wt % of dibutyltin dilaurate solution. 1 g of hexamethylene diisocyanate (HMDI) as a thermal-crosslinking agent was mixed with 9 g of toluene to prepare a 10 wt % HMDI solution. In addition, 173.84 g of resin E solution and 103 g of toluene were mixed, and after fully stirring and mixing, 8.06 g of the above-mentioned HMDI solution (the ratio of equivalent numbers for NCO to OH was 0.309) and 0.25 g of the above-mentioned dibutyltin dilaurate solution were added and stirred for another 30 minutes to fully mix into a clear and transparent mixed solution. So far, the adhesive solution e1 with a solid content of 35.4 wt % was prepared.

Preparation Example 14

Preparation of Adhesive Solution e2 (Using Resin E)

The adhesive solution e2 was prepared using the method of preparing the adhesive solution e1 in Preparation Example 13, wherein 10.66 g of a HMDI solution (the ratio of equivalent numbers for NCO to OH was 0.409) was added. The adhesive solution e2 with a solid content of 35.1 wt % was prepared.

Preparation Example 15

Preparation of Adhesive Solution e3 (Using Resin E)

The adhesive solution e3 was prepared using the method of preparing the adhesive solution e1 in Preparation Example 13, wherein 12.94 g of a HMDI solution (the ratio of equivalent numbers for NCO to OH was 0.496) was added. The adhesive solution e3 with a solid content of 34.9 wt % was prepared.

Optically clear adhesive layer preparation, film thickness measurement, glass peel adhesion test, total transmittance test, and haze test

Test Example 1

The preparation of the optically clear adhesive layer A1: a blade with a gap of 560 μm and a film applicator coater (ZAA2300, ZEHNTNER) with a width of 150 mm were used. The adhesive solution a1 (the ratio of equivalent numbers for NCO to OH was 0.025) was coated on a release PET (thickness: 30 μm, L130C. Nanya Co., Ltd., PET: polyethylene terephthalate). The release PET with coated adhesive solution a1 was dried in an oven at 110° C. for 10 minutes, followed by being placed in another oven to be aged at 70° C. for 18 hours, and then taken out and left to cool down to room temperature, the adhesive layer A1 containing the release PET was obtained.

The average thickness of the optically clear adhesive layer A1: a micrometer (MITUTOYO IP65) was used to measure the total thickness of six points of the above-mentioned optically clear adhesive layer A1 containing the release PET. The average value of the six points was the average total thickness. The average thickness of the optically clear adhesive layer A1 was obtained by deducting the thickness of the release PET from the average total thickness. The results of the measurements are shown in Table 1.

The peel adhesion of the optically clear adhesive layer A1 to glass: the above-mentioned optically clear adhesive layer A1 containing the release PET was cut into a long-strip film with a width of 25 mm and a length of 100 mm. Then, the long-strip film (including the release PET) was rolled back and forth once by a 2 kg roller on a primer-treated PET (thickness: 25 μm, BP21, Nanya Co., Ltd.) to make the optically clear adhesive layer A1 be pasted on the primer-treated PET. The release PET was peeled off, so that the optically clear adhesive layer A1 was transferred onto the primer PET. The primer PET was rolled back and forth once by the 2 kg roller on a glass plate with a thickness of 1.8 mm to make the optically clear adhesive layer A1 be pasted on the glass plate to prepare a combined test pieces with the three-layer structure of the primer PET/the optically clear adhesive layer A1/the glass plate. Three sets of combined test pieces were produced. The combined test pieces were allowed to stand at room temperature for 24 hours, and then the peel adhesions of the combined test pieces were measured. The results of the measurements are shown in Table 1. The peel adhesions were measured according to ASTM D3330. The measurement conditions were as follows. A tensile testing machine (QC-506B1, Cometech Testing Machines Co., Ltd.) was used. The angle of the primer PET being pulled up was 180°. The pulling speed was 300 mm/min.

The total transmittance and haze of the optically clear adhesive layer A1: the above-mentioned optically clear adhesive layer A1 containing the release PET was used as a test piece. The test piece was cut into a size of 45 mm in width and 75 mm in length. The release PET was rolled back and forth once by a 2 kg roller on an optical glass with a thickness of 0.7 mm to make the optically clear layer A1 be pasted on an optical glass. The release PET was peeled off, so that a measurement test piece with the structure of the optically clear adhesive layer A1/the optical glass was made. The total transmittance and haze were measured according to ASTM D1003. The measurement instrument was Haze meter (NDH 2000, Nippon Denshoku). The measurement steps involved first calibrating the instrument with the optical glass substrate, and then measuring the total transmittance and haze of the measurement test piece. Each measurement test piece was measured at three points, and the average value of the three points was the average measurement value of the measurement test piece. The results of the measurements are shown in Table 1.

Test Example 2

The preparation of the optically clear adhesive layer A2: the optically clear adhesive layer A2 was prepared in the same way as the optically clear adhesive layer A1, wherein the adhesive solution a2 (the ratio of equivalent numbers for NCO to OH was 0.049) was coated on a release PET. The optically clear adhesive layer A2 containing the release PET was obtained.

The test results of the average thickness, the peel adhesion to glass, the total transmittance, and the haze of the optically clear adhesive layer A2 are shown in Table 1.

Test Example 3

The preparation of the optically clear adhesive layer A3: the optically clear adhesive layer A3 was prepared in the same way as the optically clear adhesive layer A1, wherein the adhesive solution a3 (the ratio of equivalent numbers for NCO to OH was 0.074) was coated on a release PET. The optically clear adhesive layer A3 containing the release PET was obtained.

The test results of the average thickness, the peel adhesion to glass, the total transmittance, and the haze of the optically clear adhesive layer A3 are shown in Table 1.

TABLE 1

| Resin A | Test Example 1 | Test Example 2 | Test Example 3 |
|---|---|---|---|
| NCO/OH (ratio of equivalent numbers) | 0.025 | 0.049 | 0.074 |
| Average thickness (μm) | 100.6 | 101.3 | 100.5 |
| Average peel adhesion (gf/25 mm) | 2833 | 2167 | 2033 |
| Average total transmittance (%) | 99.9 | 99.9 | 99.9 |
| Average haze (%) | 0.23 | 0.25 | 0.24 |

Test Example 4

The preparation of the optically clear adhesive layer B1: the optically clear adhesive layer B1 was prepared in the same way as the optically clear adhesive layer A1, wherein the adhesive solution b1 (the ratio of equivalent numbers for NCO to OH was 0.024) was coated on a release PET. The optically clear adhesive layer B1 containing the release PET was obtained.

The test results of the average thickness, the peel adhesion to glass, the total transmittance, and the haze of the optically clear adhesive layer B1 are shown in Table 2.

Test Example 5

The preparation of the optically clear adhesive layer B2: the optically clear adhesive layer B2 was prepared in the same way as the optically clear adhesive layer A1, wherein the adhesive solution b2 (the ratio of equivalent numbers for NCO to OH was 0.052) was coated on a release PET. The optically clear adhesive layer B2 containing the release PET was obtained.

The test results of the average thickness, the peel adhesion to glass, the total transmittance, and the haze of the optically clear adhesive layer B2 are shown in Table 2.

Test Example 6

The preparation of the optically clear adhesive layer B3: the optically clear adhesive layer B3 was prepared in the same way as the optically clear adhesive layer A1, wherein the adhesive solution b3 (the ratio of equivalent numbers for NCO to OH was 0.076) was coated on a release PET. The optically clear adhesive layer B3 containing the release PET was obtained.

The test results of the average thickness, the peel adhesion to glass, the total transmittance, and the haze of the optically clear adhesive layer B3 are shown in Table 2.

TABLE 2

| Resin B | Test Example 4 | Test Example 5 | Test Example 6 |
|---|---|---|---|
| NCO/OH (ratio of equivalent numbers) | 0.024 | 0.052 | 0.076 |
| Average thickness (μm) | 100.2 | 100.1 | 101.3 |
| Average peel adhesion (gf/25 mm) | 3100 | 2300 | 2100 |
| Average total transmittance (%) | 99.9 | 99.9 | 99.9 |
| Average haze (%) | 0.24 | 0.26 | 0.26 |

Test Example 7

The preparation of the optically clear adhesive layer C1: the optically clear adhesive layer C1 was prepared in the same way as the optically clear adhesive layer A1, wherein the adhesive solution c1 (the ratio of equivalent numbers for NCO to OH was 0.026) was coated on a release PET. The optically clear adhesive layer C1 containing the release PET was obtained.

The test results of the average thickness, the peel adhesion to glass, the total transmittance, and the haze of the optically clear adhesive layer C1 are shown in Table 3.

Test Example 8

The preparation of the optically clear adhesive layer C2: the optically clear adhesive layer C2 was prepared in the same way as the optically clear adhesive layer A1, wherein the adhesive solution c2 (the ratio of equivalent numbers for NCO to OH was 0.050) was coated on a release PET. The optically clear adhesive layer C2 containing the release PET was obtained.

The test results of the average thickness, the peel adhesion to glass, the total transmittance, and the haze of the optically clear adhesive layer C2 are shown in Table 3.

Test Example 9

The preparation of the optically clear adhesive layer C3: the optically clear adhesive layer C3 was prepared in the same way as the optically clear adhesive layer A1, wherein the adhesive solution c3 (the ratio of equivalent numbers for NCO to OH was 0.076) was coated on a release PET. The optically clear adhesive layer C3 containing the release PET was obtained.

The test results of the average thickness, the peel adhesion to glass, the total transmittance, and the haze of the optically clear adhesive layer C3 are shown in Table 3.

TABLE 3

| Resin C | Test Example 7 | Test Example 8 | Test Example 9 |
|---|---|---|---|
| NCO/OH (ratio of equivalent numbers) | 0.026 | 0.050 | 0.076 |
| Average thickness (μm) | 101.4 | 100.3 | 100.3 |
| Average peel adhesion (gf/25 mm) | 3367 | 2467 | 2167 |
| Average total transmittance (%) | 99.9 | 99.9 | 99.9 |
| Average haze (%) | 0.23 | 0.25 | 0.24 |

Test Example 10

The preparation of the optically clear adhesive layer D1: the optically clear adhesive layer D1 was prepared in the same way as the optically clear adhesive layer A1, wherein the adhesive solution d1 (the ratio of equivalent numbers for NCO to OH was 0.132) was coated on a release PET. The optically clear adhesive layer D1 containing the release PET was obtained.

The test results of the average thickness, the peel adhesion to glass, the total transmittance, and the haze of the optically clear adhesive layer D1 are shown in Table 4.

Test Example 11

The preparation of the optically clear adhesive layer D2: the optically clear adhesive layer D2 was prepared in the same way as the optically clear adhesive layer A1, wherein the adhesive solution d2 (the ratio of equivalent numbers for NCO to OH was 0.147) was coated on a release PET. The optically clear adhesive layer D2 containing the release PET was obtained.

The test results of the average thickness, the peel adhesion to glass, the total transmittance, and the haze of the optically clear adhesive layer D2 are shown in Table 4.

Test Example 12

The preparation of the optically clear adhesive layer D3: the optically clear adhesive layer D3 was prepared in the same way as the optically clear adhesive layer A1, wherein the adhesive solution d3 (the ratio of equivalent numbers for NCO to OH was 0.173) was coated on a release PET. The optically clear adhesive layer D3 containing the release PET was obtained.

The test results of the average thickness, the peel adhesion to glass, the total transmittance, and the haze of the optically clear adhesive layer D3 are shown in Table 4.

TABLE 4

| Resin D | Test Example 10 | Test Example 11 | Test Example 12 |
|---|---|---|---|
| NCO/OH (ratio of equivalent numbers) | 0.132 | 0.147 | 0.173 |
| Average thickness (μm) | 99.7 | 100.3 | 100.3 |
| Average peel adhesion (gf/25mm) | 2100 | 1750 | 1550 |
| Average total transmittance (%) | 99.9 | 99.9 | 99.9 |
| Average haze (%) | 0.25 | 0.21 | 0.28 |

Test Example 13

The preparation of the optically clear adhesive layer E1: the optically clear adhesive layer E1 was prepared in the same way as the optically clear adhesive layer A1, wherein the adhesive solution e1 (the ratio of equivalent numbers for NCO to OH was 0.309) was coated on a release PET. The optically clear adhesive layer E1 containing the release PET was obtained.

The test results of the average thickness, the peel adhesion to glass, the total transmittance, and the haze of the optically clear adhesive layer E1 are shown in Table 5.

Test Example 14

The preparation of the optically clear adhesive layer E2: the optically clear adhesive layer E2 was prepared in the same way as the optically clear adhesive layer A1, wherein the adhesive solution e2 (the ratio of equivalent numbers for NCO to OH was 0.409) was coated on a release PET. The optically clear adhesive layer E2 containing the release PET was obtained.

The test results of the average thickness, the peel adhesion to glass, the total transmittance, and the haze of the optically clear adhesive layer E2 are shown in Table 5.

Test Example 15

The preparation of the optically clear adhesive layer E3: the optically clear adhesive layer E3 was prepared in the same way as the optically clear adhesive layer A1, wherein the adhesive solution e3 (the ratio of equivalent numbers for NCO to OH was 0.496) was coated on a release PET. The optically clear adhesive layer E3 containing the release PET was obtained.

The test results of the average thickness, the peel adhesion to glass, the total transmittance, and the haze of the optically clear adhesive layer E3 are shown in Table 5.

TABLE 5

| Resin E | Test Example 13 | Test Example 14 | Test Example 15 |
|---|---|---|---|
| NCO/OH (ratio of equivalent numbers) | 0.309 | 0.409 | 0.496 |
| Average thickness (μm) | 100.5 | 100.1 | 100.4 |
| Average peel adhesion (gf/25 mm) | 1355 | 924 | 832 |
| Average total transmittance (%) | 99.9 | 99.9 | 99.9 |
| Average haze (%) | 0.29 | 0.29 | 0.27 |

In accordance with Test Examples 1-15, the peel adhesions of the optically clear adhesive layers of the present disclosure were maintained at least at 800 gf/25 mm at room temperature, the total transmittances were close to complete transmittance, and the hazes were also lower than 0.5%, which meet the requirements for assembling touch displays. For example, the test results meet the specifications for bonding and fixing a touch panel and a polarizer of a display modules.

Example 1

Freeze-Peel Adhesion Test on Glass and on Polarizer for Optically Clear Adhesive Layers with Different r Values (Using Resin A)

In the same way as the above-mentioned method of preparing the optically clear adhesive layer A1, the resin A was used to prepare a group of adhesives, containing adhesive 1 and adhesive 2, with different r values (i.e. NCO/OH ratio of equivalent numbers). The r value of the adhesive 1 was defined as $r_1=0.025$. The r value of the adhesive 2 was defined as $r_2=0.074$. The average thicknesses of adhesives were measured (the same as the above-mentioned method for measuring the average thickness of the optically clear adhesive layer A1). The two adhesives were prepared as test pieces, respectively, for measuring the peel adhesions. The adhesive 1 ($r_1=0.025$) was prepared into test pieces (i.e. combined test pieces with the structure of the primer PET/ the adhesive 1/the glass plate) for measuring peel adhesion on glass. The preparation method was the same as that of Test Example 1. The adhesive 2 ($r_2=0.074$) was prepared into test pieces for measuring peel adhesion on polarizer. The preparation method was as following: a polarizer laminate with a structure of a protective film/a polarizer/a pressure-sensitive adhesive/a release film was first prepared, and the protective film was torn off before use. The adhesive 2 was cut into a long-strip film with a width of 25 mm and a length of 100 mm. Then, the long-strip film (including the release PET) was rolled back and forth once by a 2 kg roller on a primer-treated PET to make the adhesive 2 be pasted on a primer-treated PET (thickness: 25 μm, BP21, Nanya Co., Ltd.). The release PET was peeled off, so that the adhesive 2 was transferred onto the primer-treated PET. The primer-treated PET was rolled back and forth once by the 2 kg roller on the polarizer surface of the polarizer laminate without the protective film, and the adhesive 2 was pasted on the polarizer laminate without the protective film to prepare combined test pieces with the structure of the primer PET/ the adhesive 2/the polarizer/the pressure-sensitive adhesive/ the release film. Three sets of combined test pieces were produced. The combined test pieces were allowed to stand at room temperature for 24 hours. The above-mentioned two kinds of test pieces for testing peel adhesions were respectively placed in a freezer at −50° C. for 30 minutes, and then the peel adhesions were measured (the same as the method for measuring the peel adhesion of the optically clear adhesive layer A1 on glass). The measurement results are shown in Table 6.

Example 2

Freeze-Peel Adhesion Test on Glass and on Polarizer for Optically Clear Adhesive Layers with Different r Values (Using Resin A)

In the same way as the method of Example 1, another group of adhesives was prepared, and their r values were $r_1=0.030$ (adhesive 3) and $r_2=0.061$ (adhesive 4) respectively. The thicknesses and peel adhesions after 30-minute treatment at −50° C. were measured. The results of the measurements are shown in Table 6.

Example 3

Freeze-Peel Adhesion Test on Glass and on Polarizer for Optically Clear Adhesive Layers with Different r Values (Using Resin A)

In the same way as the method of Example 1, another group of adhesives was prepared, and their r values were $r_1=0.037$ (adhesive 5) and $r_2=0.072$ (adhesive 6) respectively. The thicknesses and peel adhesions after 30-minute treatment at −50° C. were measured. The results of the measurements are shown in Table 6.

Comparative Example 1

Freeze-Peel Adhesion Test on Glass and on Polarizer for Optically Clear Adhesive Layers with Different r Values (Using Resin A)

In the same way as the method of Example 1, another group of adhesives was prepared, and their r values were $r_1=0.046$ (adhesive 7) and $r_2=0.046$ (adhesive 8) respectively. The thicknesses and peel adhesions after 30-minute treatment at −50° C. were measured. The results of the measurements are shown in Table 6.

TABLE 6

(using resin A)

|  | Example 1 | | Example 2 | | Example 3 | | Com. Example 1 | |
| --- | --- | --- | --- | --- | --- | --- | --- | --- |
| r values | r1 = 0.025 | r2 = 0.074 | r1 = 0.030 | r2 = 0.061 | r1 = 0.037 | r2 = 0.072 | r1 = 0.046 | r2 = 0.046 |
| r2 − r1 | 0.049 | | 0.031 | | 0.035 | | 0 | |
| Thickness (μm) | 75.6 | 76.1 | 75.8 | 74.4 | 75.8 | 75.2 | 76.5 | 76.5 |
| −50° C. peel adhesion (gf/25 mm) | 270 adhesive 1/glass | 50 adhesive 2/polarizer | 263 adhesive 3/glass | 77 adhesive 4/polarizer | 253 adhesive 5/glass | 67 adhesive 6/polarizer | 87 adhesive 7/glass | 84 adhesive 8/polarizer |

Example 4

Freeze-Peel Adhesion Test on Glass and on Polarizer for Optically Clear Adhesive Layers with Different r Values (Using Resin B)

In the same way as the method of Example 1, another group of adhesives was prepared, and their r values were r1=0.024 (adhesive 9) and r2=0.070 (adhesive 10) respectively. The thicknesses and peel adhesions after 30-minute treatment at −50° C. were measured. The results of the measurements are shown in Table 7.

Comparative Example 2

Freeze-Peel Adhesion Test on Glass and on Polarizer for Optically Clear Adhesive Layers with Different r Values (Using Resin B)

In the same way as the method of Example 1, another group of adhesives was prepared, and their r values were r1=0.062 (adhesive 15) and r2=0.072 (adhesive 16) respectively. The thicknesses and peel adhesions after 30-minute treatment at −50° C. were measured. The results of the measurements are shown in Table 7.

TABLE 7

(using resin B)

|  | Example 4 | | Example 5 | | Example 6 | | Com. Example 2 | |
| --- | --- | --- | --- | --- | --- | --- | --- | --- |
| r values | r1 = 0.024 | r2 = 0.070 | r1 = 0.033 | r2 = 0.062 | r1 = 0.037 | r2 = 0.072 | r1 = 0.062 | r2 = 0.072 |
| r2 − r1 | 0.046 | | 0.029 | | 0.035 | | 0.01 | |
| Thickness (μm) | 75.9 | 75.3 | 75.2 | 74.2 | 75.4 | 76.2 | 74.2 | 76.2 |
| −50° C. peel adhesion (gf/25 mm) | 283 adhesive 9/glass | 60 adhesive 10/polarizer | 250 adhesive 11/glass | 80 adhesive 12/polarizer | 247 adhesive 13/glass | 57 adhesive 14/polarizer | 140 adhesive 15/glass | 57 adhesive 16/polarizer |

Example 5

Freeze-Peel Adhesion Test on Glass and on Polarizer for Optically Clear Adhesive Layers with Different r Values (Using Resin B)

In the same way as the method of Example 1, another group of adhesives was prepared, and their r values were r1=0.033 (adhesive 11) and r2=0.062 (adhesive 12) respectively. The thicknesses and peel adhesions after 30-minute treatment at −50° C. were measured. The results of the measurements are shown in Table 7.

Example 6

Freeze-Peel Adhesion Test on Glass and on Polarizer for Optically Clear Adhesive Layers with Different r Values (Using Resin B)

In the same way as the method of Example 1, another group of adhesives was prepared, and their r values were r1=0.037 (adhesive 13) and r2=0.072 (adhesive 14) respectively. The thicknesses and peel adhesions after 30-minute treatment at −50° C. were measured. The results of the measurements are shown in Table 7.

Example 7

Freeze-Peel Adhesion Test on Glass and on Polarizer for Optically Clear Adhesive Layers with Different r Values (Using Resin C)

In the same way as the method of Example 1, another group of adhesives was prepared, and their r values were r1=0.026 (adhesive 17) and r2=0.101 (adhesive 18) respectively. The thicknesses and peel adhesions after 30-minute treatment at −50° C. were measured. The results of the measurements are shown in Table 8.

Example 8

Freeze-Peel Adhesion Test on Glass and on Polarizer for Optically Clear Adhesive Layers with Different r Values (Using Resin C)

In the same way as the method of Example 1, another group of adhesives was prepared, and their r values were r1=0.039 (adhesive 19) and r2=0.076 (adhesive 20) respectively. The thicknesses and peel adhesions after 30-minute treatment at −50° C. were measured. The results of the measurements are shown in Table 8.

Example 9

Freeze-Peel Adhesion Test on Glass and on Polarizer for Optically Clear Adhesive Layers with Different r Values (Using Resin C)

In the same way as the method of Example 1, another group of adhesives was prepared, and their r values were r1=0.045 (adhesive 21) and r2=0.101 (adhesive 22) respectively. The thicknesses and peel adhesions after 30-minute treatment at −50° C. were measured. The results of the measurements are shown in Table 8.

Comparative Example 3

Freeze-Peel Adhesion Test on Glass and on Polarizer for Optically Clear Adhesive Layers with Different r Values (Using Resin C)

In the same way as the method of Example 1, another group of adhesives was prepared, and their r values were r1=0.026 (adhesive 23) and r2=0.039 (adhesive 24) respectively. The thicknesses and peel adhesions after 30-minute treatment at −50° C. were measured. The results of the measurements are shown in Table 8.

TABLE 8

| | (using resin C) | | | | | | | |
|---|---|---|---|---|---|---|---|---|
| | Example 7 | | Example 8 | | Example 9 | | Com. Example 3 | |
| r values | r1 = 0.026 | r2 = 0.101 | r1 = 0.039 | r2 = 0.076 | r1 = 0.045 | r2 = 0.101 | r1 = 0.026 | r2 = 0.039 |
| r2 − r1 | 0.075 | | 0.037 | | 0.056 | | 0.013 | |
| Thickness (μm) | 75.4 | 75.9 | 75.5 | 75.2 | 76.4 | 75.3 | 75.4 | 75.4 |
| −50° C. peel adhesion (gf/25 mm) | 293 adhesive 17/glass | 50 adhesive 18/polarizer | 267 adhesive 19/glass | 60 adhesive 20/polarizer | 223 adhesive 21/glass | 50 adhesive 22/polarizer | 293 adhesive 23/glass | 250 adhesive 24/polarizer |

Example 10

Freeze-Peel Adhesion Test on Glass and on Polarizer for Optically Clear Adhesive Layers with Different r Values (Using Resin D)

In the same way as the method of Example 1, another group of adhesives was prepared, and their r values were r1=0.132 (adhesive 25) and r2=0.173 (adhesive 26) respectively. The thicknesses and peel adhesions after 30-minute treatment at −50° C. were measured. The results of the measurements are shown in Table 9.

Example 11

Freeze-Peel Adhesion Test on Glass and on Polarizer for Optically Clear Adhesive Layers with Different r Values (Using Resin D)

In the same way as the method of Example 1, another group of adhesives was prepared, and their r values were r1=0.132 (adhesive 27) and r2=0.165 (adhesive 28) respectively. The thicknesses and peel adhesions after 30-minute treatment at −50° C. were measured. The results of the measurements are shown in Table 9.

Example 12

Freeze-Peel Adhesion Test on Glass and on Polarizer for Optically Clear Adhesive Layers with Different r Values (Using Resin D)

In the same way as the method of Example 1, another group of adhesives was prepared, and their r values were r1=0.139 (adhesive 29) and r2=0.173 (adhesive 30) respectively. The thicknesses and peel adhesions after 30-minute treatment at −50° C. were measured. The results of the measurements are shown in Table 9.

Comparative Example 4

Freeze-Peel Adhesion Test on Glass and on Polarizer for Optically Clear Adhesive Layers with Different r Values (Using Resin D)

In the same way as the method of Example 1, another group of adhesives was prepared, and their r values were r1=0.165 (adhesive 31) and r2=0.173 (adhesive 32) respectively. The thicknesses and peel adhesions after 30-minute treatment at −50° C. were measured. The results of the measurements are shown in Table 9.

Example 15

Freeze-Peel Adhesion Test on Glass and on Polarizer for Optically Clear Adhesive Layers with Different r Values (Using Resin E)

In the same way as the method of Example 1, another group of adhesives was prepared, and their r values were r1=0.330 (adhesive 37) and r2=0.496 (adhesive 38) respectively. The thicknesses and peel adhesions after 30-minute treatment at −50° C. were measured. The results of the measurements are shown in Table 10.

TABLE 9

(using resin D)

|  | Example 10 | | Example 11 | | Example 12 | | Com. Example 4 | |
|---|---|---|---|---|---|---|---|---|
| r values | r1 = 0.132 | r2 = 0.173 | r1 = 0.132 | r2 = 0.165 | r1 = 0.139 | r2 = 0.173 | r1 = 0.165 | r2 = 0.173 |
| r2 − r1 | 0.041 | | 0.033 | | 0.034 | | 0.008 | |
| Thickness (μm) | 75.6 | 75.1 | 75.5 | 75.5 | 74.8 | 75.9 | 76.2 | 75.3 |
| −50° C. peel adhesion (gf/25 mm) | 240 adhesive 25/glass | 43 adhesive 26/polarizer | 240 adhesive 27/glass | 46 adhesive 28/polarizer | 237 adhesive 29/glass | 43 adhesive 30/polarizer | 100 adhesive 31/glass | 43 adhesive 32/polarizer |

Example 13

Freeze-Peel Adhesion Test on Glass and on Polarizer for Optically Clear Adhesive Layers with Different r Values (Using Resin E)

In the same way as the method of Example 1, another group of adhesives was prepared, and their r values were r1=0.309 (adhesive 33) and r2=0.496 (adhesive 34) respectively. The thicknesses and peel adhesions after 30-minute treatment at −50° C. were measured. The results of the measurements are shown in Table 10.

Comparative Example 5

Freeze-Peel Adhesion Test on Glass and on Polarizer for Optically Clear Adhesive Layers with Different r Values (Using Resin E)

In the same way as the method of Example 1, another group of adhesives was prepared, and their r values were r1=0.4% (adhesive 39) and r2=0.496 (adhesive 40) respectively. The thicknesses and peel adhesions after 30-minute treatment at −50° C. were measured. The results of the measurements are shown in Table 10.

TABLE 10

(using resin E)

|  | Example 13 | | Example 14 | | Example 15 | | Com. Example 5 | |
|---|---|---|---|---|---|---|---|---|
| r values | r1 = 0.309 | r2 = 0.496 | r1 = 0.309 | r2 = 0.450 | r1 = 0.330 | r2 = 0.496 | r1 = 0.496 | r2 = 0.496 |
| r2 − r1 | 0.187 | | 0.141 | | 0.166 | | 0 | |
| Thickness (μm) | 75.3 | 75.5 | 75.4 | 75.6 | 74.6 | 76.1 | 75.6 | 75.2 |
| −50° C. peel adhesion (gf/25 mm) | 220 adhesive 33/glass | 30 adhesive 34/polarizer | 220 adhesive 35/glass | 32 adhesive 36/polarizer | 210 adhesive 37/glass | 30 adhesive 38/polarizer | 30 adhesive 39/glass | 30 adhesive 40/polarizer |

Example 14

Freeze-Peel Adhesion Test on Glass and on Polarizer for of Optically Clear Adhesive Layers with Different r Values (Using Resin E)

In the same way as the method of Example 1, another group of adhesives was prepared, and their r values were r1=0.309 (adhesive 35) and r2=0.450 (adhesive 36) respectively. The thicknesses and peel adhesions after 30-minute treatment at −50° C. were measured. The results of the measurements are shown in Table 10.

In accordance with Examples 1-15, in the present disclosure, the resins A, B, C, P D and E were used to prepare adhesive layers with different NCO/OH ratio of equivalent numbers (r values), respectively, and then the adhesive layers were respectively prepared into peel-adhesion test pieces. For example, in each example, one adhesive layer (r=r1) was used to prepare a peel-adhesion test piece on glass, and another adhesive layer (r=r2) was used to prepare a peel-adhesion test piece on a polarizer. The values of r1 and r2 were consistent with the conditions of r1<r2≤0.8 and r2−r1≥0.025. After the two kinds of test pieces were subjected to a low-temperature freezing treatment, it can be found that the peel adhesion of the disclosed adhesive (r=r1) on the glass reached more than 210 gf/25 mm, while the peel adhesion of the disclosed adhesive (r=r2) on the polarizer was only 80 gf/25 mm at most. That is, after the two adhesives of the present disclosure are subjected to a low-temperature freezing treatment, the peel adhesion of the first adhesive (r=r1) on the glass is different from that of the second adhesive (r=r2) on the polarizer. Moreover, the peel adhesion of the first adhesive (r=r1) on the glass is significantly greater than the peel adhesion of the second adhesive (r=r2) on the polarizer. This means that the two adhesives can be combined to prepare a freeze-peelable double-sided optically clear adhesive. Moreover, after the double-sided optically clear adhesive is adhered on the glass and on the polarizer respectively, and after freezing and peeling off the substrate, residue of the double-sided optically clear adhesive will leave only on the glass.

Example 16

Reworkability Test of an Article with Multilayer Structure (Using Resin A)

Preparation of double-sided optically clear adhesive: the resin A was used to prepare adhesives with different r values using the method of Example 1. The first sheet of adhesive (r1=0.025) was prepared on a heavy-release PET (thickness: 50 μm, L150A, Nanya Co., Ltd.). The second sheet of adhesive (r2=0.074) was prepared on a light-release PET (thickness: 30 μm, L130C, Nanya Co., Ltd.). The first sheet of adhesive and the second sheet of adhesive were stuck together by rolling a 2 kg roller back and forth to prepare a double-sided optically clear adhesive made of the heavy-release PET/the first sheet of adhesive/the second sheet of adhesive/the light-release PET. The average thickness of the double-sided optically clear adhesive was measured (the same as the above-mentioned method for measuring the average thickness of the optically clear adhesive layer A1). Test pieces of articles with multilayer structures for measuring reworkabilities and peel adhesions are prepared as described below.

Preparation of test pieces of an article with multilayer structure for measuring reworkability and for testing freeze-peel adhesions (after treatment at −50° C. for 30 minutes): a polarizer laminate with a structure of a protective film/a polarizer/a pressure-sensitive adhesive/a release film was first prepared, and the protective film was torn off before use. The double-sided optically clear adhesive was cut into a long-strip film with a width of 45 mm and a length of 75 mm. The light-release PET of the long-strip film was torn off. Then, the heavy-release PET of the long-strip film was rolled back and forth once by a 2 kg roller on the polarizer surface of the polarizer laminate without the protective film to make the double-sided optically clear adhesive be pasted on the polarizer surface. The heavy-release PET of the double-sided optically clear adhesive was peeled off. The release film of the polarizer laminate was then rolled back and forth by the 2 kg roller on a glass plate with a thickness of 1.8 mm to make the double-sided optically clear adhesive be pasted on the glass plate to prepare a multilayer-structure test piece made of the glass plate/the first sheet of adhesive (the first surface adhesive)/the second sheet of adhesive (the second surface adhesive)/the polarizer/the pressure-sensitive adhesive/the release film. Three sets of the multilayer-structure test pieces were prepared. The multilayer-structure test pieces were placed in a freezer at −50° C. for 30 minutes, and then the average peel adhesion was measured (the same as the method for measuring the peel adhesion of the optically clear adhesive layer A1 on glass). The situation of the double-sided optically clear adhesive residue was also inspected. The results of the measurements are shown in Table 11.

Example 17

Reworkability Test of an Article with Multilayer Structure (Using Resin A)

Preparation of double-sided optically clear adhesive and multilayer-structure test pieces and test method are the same as in Example 16. The r values of the first sheet of adhesive and the second sheet of adhesive were r1=0.030 and r2=0.061 respectively. The test results are shown in Table 11.

Example 18

Reworkability Test of an Article with Multilayer Structure (Using Resin A)

Preparation of double-sided optically clear adhesive and multilayer-structure test pieces and test method are the same as in Example 16. The r values of the first sheet of adhesive and the second sheet of adhesive were r1=0.037 and r2=0.072 respectively. The test results are shown in Table 11.

Comparative Example 6

Reworkability Test of an Article with Multilayer Structure (Using Resin A)

Preparation of double-sided optically clear adhesive and multilayer-structure test pieces and test method are the same as in Example 16. The r values of the first sheet of adhesive and the second sheet of adhesive were r1=0.046 and r2=0.046 respectively. The test results are shown in Table 11.

TABLE 11

| Resin A | Example 16 | Example 17 | Example 18 | Com. Example 6 |
|---|---|---|---|---|
| r1/r2 | 0.025/0.074 | 0.030/0.061 | 0.037/0.072 | 0.046/0.046 |
| r2 − r1 | 0.049 | 0.031 | 0.035 | 0 |
| Average thickness of double-sided optically clear adhesive (μm) | 151.7 | 150.2 | 151.0 | 153.0 |
| Residue of double-sided optically clear adhesive on glass (freeze-peeling treatment) | residue | residue | residue | residue |
| Residue of double-sided optically clear adhesive on polarizer (freeze-peeling treatment) | no residue | no residue | no residue | residue |
| Average peel adhesion (gf/25 mm) (freeze-peeling treatment) | 53 | 80 | 60 | 80 |

Example 19

Reworkability Test of an Article with Multilayer Structure (Using Resin B)

Preparation of double-sided optically clear adhesive and multilayer-structure test pieces and test method are the same as in Example 16. The r values of the first sheet of adhesive and the second sheet of adhesive were r1=0.024 and r2=0.070 respectively. The test results are shown in Table 12.

Example 20

Reworkability Test of an Article with Multilayer Structure (Using Resin B)

Preparation of double-sided optically clear adhesive and multilayer-structure test pieces and test method are the same as in Example 16. The r values of the first sheet of adhesive and the second sheet of adhesive were r1=0.033 and r2=0.062 respectively. The test results are shown in Table 12.

Example 21

Reworkability Test of an Article with Multilayer Structure (Using Resin B)

Preparation of double-sided optically clear adhesive and multilayer-structure test pieces and test method are the same as in Example 16. The r values of the first sheet of adhesive and the second sheet of adhesive were r1=1.037 and r2=1.072 respectively. The test results are shown in Table 12.

Comparative Example 7

Reworkability Test of an Article with Multilayer Structure (Using Resin B)

Preparation of double-sided optically clear adhesive and multilayer-structure test pieces and test method are the same as in Example 16. The r values of the first sheet of adhesive and the second sheet of adhesive were r1=0.062 and r2=0.072 respectively. The test results are shown in Table 12.

TABLE 12

| Resin B | Example 19 | Example 20 | Example 21 | Com. Example 7 |
|---|---|---|---|---|
| r1/r2 | 0.024/0.070 | 0.033/0.062 | 0.037/0.072 | 0.062/0.072 |
| r2 − r1 | 0.046 | 0.02.9 | 0.035 | 0.01 |
| Average thickness of double-sided optically clear adhesive (μm) | 151.2 | 149.4 | 151.6 | 150.6 |
| Residue of double-sided optically clear adhesive on glass (freeze-peeling treatment) | residue | residue | residue | residue |
| Residue of double-sided optically clear adhesive on polarizer (freeze-peeling treatment) | no residue | no residue | no residue | residue |
| Average peel adhesion (gf/25 mm) (freeze-peeling treatment) | 57 | 73 | 53 | 113 |

Example 22

Reworkability Test of an Article with Multilayer Structure (Using Resin C)

Preparation of double-sided optically clear adhesive and multilayer-structure test pieces and test method are the same as in Example 16. The r values of the first sheet of adhesive and the second sheet of adhesive were r1=0.026 and r2=0.101 respectively. The test results are shown in Table 13.

Example 23

Reworkability Test of an Article with Multilayer Structure (Using Resin C)

Preparation of double-sided optically clear adhesive and multilayer-structure test pieces and test method are the same as in Example 16. The r values of the first sheet of adhesive and the second sheet of adhesive were r1=0.039 and r2=0.076 respectively. The test results are shown in Table 13.

Example 24

Reworkability Test of an Article with Multilayer Structure (Using Resin C)

Preparation of double-sided optically clear adhesive and multilayer-structure test pieces and test method are the same as in Example 16 The r values of the first sheet of adhesive and the second sheet of adhesive were r1=0.045 and r2=0.101 respectively. The test results are shown in Table 13.

TABLE 13

| Resin C | Example 22 | Example 23 | Example 24 | Com. Example 8 |
|---|---|---|---|---|
| r1/r2 | 0.026/0.101 | 0.039/0.076 | 0.045/0.101 | 0.026/0.039 |
| r2 − r1 | 0.075 | 0.037 | 0.056 | 0.013 |
| Average thickness of double-sided optically clear adhesive (μm) | 151.3 | 150.7 | 151.7 | 150.8 |
| Residue of double-sided optically clear adhesive on glass (freeze-peeling treatment) | residue | residue | residue | residue |
| Residue of double-sided optically clear adhesive on polarizer (freeze-peeling treatment) | no residue | no residue | no residue | residue |
| Average peel adhesion (gf/25 mm) (freeze-peeling treatment) | 53 | 67 | 57 | 272 |

Example 25

Reworkability Test of an Article with Multilayer Structure (Using Resin D)

Preparation of double-sided optically clear adhesive and multilayer-structure test pieces and test method are the same as in Example 16. The r values of the first sheet of adhesive and the second sheet of adhesive were r1=0.132 and r2=0.173 respectively. The test results are shown in Table 14.

Example 26

Reworkability test of an article with multilayer structure (using resin D)
Preparation of double-sided optically clear adhesive and multilayer-structure test pieces and test method are the same as in Example 16. The r values of the first sheet of adhesive and the second sheet of adhesive were r1=0.132 and r2=0.165 respectively. The test results are shown in Table 14.

Example 27

Reworkability Test of an Article with Multilayer Structure (Using Resin D)
Preparation of double-sided optically clear adhesive and multilayer-structure test pieces and test method are the same as in Example 16. The r values of the first sheet of adhesive and the second sheet of adhesive were r1=0.139 and r2=0.173 respectively. The test results are shown in Table 14.

Comparative Example 9

Reworkability Test of Multilayer an Article with Structure (Using Resin D)
Preparation of double-sided optically clear adhesive and multilayer-structure test pieces and test method are the same as in Example 16. The r values of the first sheet of adhesive and the second sheet of adhesive were r=0.165 and r2=1.173 respectively. The test results are shown in Table 14.

TABLE 14

| Resin D | Example 25 | Example 26 | Example 27 | Com. Example 9 |
|---|---|---|---|---|
| r1/r2 | 0.132/0.173 | 0.132/0.165 | 0.139/0.173 | 0.165/0.173 |
| r2 − r1 | 0.041 | 0.033 | 0.034 | 0.008 |
| Average thickness of double-sided optically clear adhesive (μm) | 150.7 | 151 | 150.7 | 151.5 |
| Residue of double-sided optically clear adhesive on glass (freeze-peeling treatment) | residue | residue | residue | residue |
| Residue of double-sided optically clear adhesive on polarizer (freeze-peeling treatment) | no residue | no residue | no residue | residue |
| Average peel adhesion (gf/25 mm) (freeze-peeling treatment) | 41 | 45 | 41 | 43 |

Example 28

Reworkability Test of an Article with Multilayer Structure (Using Resin E)
Preparation of double-sided optically clear adhesive and multilayer-structure test pieces and test method are the same as in Example 16. The r values of the first sheet of adhesive and the second sheet of adhesive were r1=0.309 and r2=0.496 respectively. The test results are shown in Table 15.

Example 29

Reworkability Test of an Article with Multilayer Structure (Using Resin E)
Preparation of double-sided optically clear adhesive and multilayer-structure test pieces and test method are the same as in Example 16. The r values of the first sheet of adhesive and the second sheet of adhesive were r1=0.309 and r2=0.450 respectively. The test results are shown in Table 15.

Example 30

Reworkability Test of Multilayer Structure (Using Resin E)
Preparation of double-sided optically clear adhesive and multilayer-structure test pieces and test method are the same as in Example 16. The r values of the first sheet of adhesive and the second sheet of adhesive were r1=0.330 and r2=0.496 respectively. The test results are shown in Table 15.

Comparative Example 10

Reworkability Test of an Article with Multilayer Structure (Using Resin E)
Preparation of double-sided optically clear adhesive and multilayer-structure test pieces and test method are the same as in Example 16. The r values of the first sheet of adhesive and the second sheet of adhesive were r1=0.496 and r2=0.496 respectively. The test results are shown in Table 15.

TABLE 15

| Resin E | Example 28 | Example 29 | Example 30 | Com. Example 10 |
|---|---|---|---|---|
| r1/r2 | 0.309/0.496 | 0.309/0.450 | 0.330/0.496 | 0.496/0.496 |
| r2 − r1 | 0.187 | 0.141 | 0.166 | 0 |
| Average thickness of double-sided optically clear adhesive (μm) | 150.8 | 151 | 150.7 | 150.8 |
| Residue of double-sided optically clear adhesive on glass (freeze-peeling treatment) | residue | residue | residue | residue |
| Residue of double-sided optically clear adhesive on polarizer (freeze-peeling treatment) | no residue | no residue | no residue | residue |
| Average peel adhesion (gf/25 mm) (freeze-peeling treatment) | 26 | 25 | 26 | 25 |

In accordance with Examples 16-30, in the present disclosure, the resins A, B, C, D, and E were used to prepare double-sided optically clear adhesives, and the adhesive layers on the both sides of the double-sided optically clear adhesive contain different NCO/OH ratio of equivalent numbers (r values). For example, in each example, one sheet of adhesive (r value=r1) was prepared, and another sheet of adhesive (r value=r2) was prepared at the same time. The two adhesives were attached to prepare a double-sided optically clear adhesive. The r value difference was in line with r1<r2≤0.8 and r2−r1; 0.025. The double-sided optically clear adhesive was used to adhere glass and polarizer, wherein the adhesive (r value=r1) was in contact with the glass, and the adhesive (r value=r2) was in contact with the polarizer. After the low-temperature freezing treatment was performed, the glass and the polarizer were peeled off. It can be found that the double-sided optically clear adhesive of the present disclosure remains only on the glass, but not on the polarizer. Since the differences in r values of the adhesive layers on both sides of the double-sided optically clear adhesive of Comparative Examples 6 to 10 were less than 0.025, it can be found by peeling off the glass and the polarizer that residues of the double-sided optically clear adhesive remain on both the glass and the polarizer. The above results indicate that after the double-sided optically clear adhesive of the present disclosure is attached to the glass and the polarizer, the glass and the polarizer can be easily peeled off by freezing treatment, and the double-sided optically clear adhesive residue will leave only on the glass. Therefore, the double-sided optically clear adhesive disclosed in the present disclosure is suitable for application in the re-working process of the touch panel, which can simplify the existing re-working process and greatly shorten the re-working man-hours.

Example 31

Reworkability Test of an Article with Multilayer Structure (Using Different Resins)

The adhesive (r1=0.025) containing the resin A was selected as the first adhesive, and its average thickness was 75.6 μm (the average peel adhesion on glass after being treated at −50° C. for 30 minutes was 270 gf/25 mm, as shown in Table 6, Example 1). The adhesive (r2=0.070) containing the resin B was selected as the second adhesive, and its average thickness was 75.3 μm (the average peel adhesion on polarizer after being treated at −50° C. for 30 minutes was 60 gf/25 mm, as shown in Table 7, Example 4). The two adhesives were attached to each other (the same as the method of preparing the double-sided optically clear adhesive in Example 16) to prepare a double-sided optically clear adhesive. The average thickness of the double-sided optically clear adhesive was measured (the same as the above-mentioned method for measuring the average thickness of optically clear adhesive layer A1). Test pieces of multilayer structure were prepared to test the reworkability and average peel adhesion of the double-sided optically clear adhesive after being treated at −50° C. for 30 minutes (the method was the same as that of Example 16). The results of the measurements are shown in Table 16.

Example 32

Reworkability Test of an Article with Multilayer Structure (Using Different Resins)

The adhesive (r1=0.030) containing the resin A was selected as the first adhesive, and its average thickness was 75.8 μm (the average peel adhesion on glass after being treated at −50° C. for 30 minutes was 263 gf/25 mm, as shown in Table 6, Example 2). The adhesive (r2=0.062) containing the resin B was selected as the second adhesive, and its average thickness was 74.2 μm (the average peel adhesion on polarizer after being treated at −50° C. for 30 minutes was 80 gf/25 mm, as shown in Table 7, Example 5). The two adhesives were attached to each other (the same as the method of preparing the double-sided optically clear adhesive in Example 16) to prepare a double-sided optically clear adhesive. The average thickness of the double-sided optically clear adhesive was measured (the same as the above-mentioned method for measuring the average thickness of optically clear adhesive layer A1). Test pieces of multilayer structure were prepared to test the reworkability and average peel adhesion of the double-sided optically clear adhesive after being treated at −50° C. for 30 minutes (the method was the same as that of Example 16). The results of the measurements are shown in Table 16.

TABLE 16

|  | Example 31 | Example 32 |
| --- | --- | --- |
| Composition of double-sided optically clear adhesive | first adhesive (resin A, r1 = 0.025) second adhesive (resin B, r2 = 0.070) | first adhesive (resin A, r1 = 0.030) second adhesive (resin B, r2 = 0.062) |
| r2 − r1 | 0.045 | 0.032 |
| Average thickness of double-sided optically clear adhesive (μm) | 150.9 | 150.0 |
| Residue of double-sided optically clear adhesive on glass (freeze-peeling treatment) | residue | residue |
| Residue of double-sided optically clear adhesive on polarizer (freeze-peeling treatment) | no residue | no residue |
| Average peel adhesion (gf/25 mm) (freeze-peeling treatment) | 57 | 73 |

In accordance with Examples 31 and 32, in the present disclosure, the resins A and B were used to prepare the double-sided optically clear adhesive, and the adhesive layers on the both sides of the double-sided optically clear adhesive contain different NCO/OH ratio of equivalent numbers (r values). For example, in each example, one sheet of adhesive (r value=r1) containing the resin A was prepared, and another sheet of adhesive (r value=r2) containing the resin B was prepared at the same time. The two adhesives were attached to each other. The r value differences were in line with r1<r2≤0.8 and r2−r12 0.025. The double-sided optically clear adhesive was used to adhere glass and polarizer, wherein the adhesive (r value=r1) containing the resin A was in contact with the glass, and the adhesive (r value=r2) containing the resin B was in contact with the polarizer. After the low-temperature freezing treatment was performed, the glass and the polarizer were peeled off. It can be found that the double-sided optically clear adhesive containing different resins of the present disclosure also remains only on the glass, but not on the polarizer. The above results indicate that after the double-sided optically clear adhesive containing different resins of the present disclosure is attached to the glass and the polarizer, the glass and the polarizer can be easily peeled off by freezing treatment, and the double-sided optically clear adhesive residue will leave only on the glass. Therefore, the double-sided optically clear adhesive disclosed in the present disclosure is suitable for application in the re-working process of the touch panel, which can simplify the existing re-working process and greatly shorten the re-working man-hours.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A double-sided optically clear adhesive, comprising:
a first adhesive layer comprising a first resin and a first thermal-crosslinking agent, wherein the first resin comprises a hydroxyl group, the first thermal-crosslinking agent comprises a first group capable of reacting with the hydroxyl group of the first resin, and a ratio of equivalent number of the first group of the first thermal-crosslinking agent to equivalent number of the hydroxyl group of the first resin is represented by r1; and
a second adhesive layer comprising a second resin and a second thermal-crosslinking agent, wherein the second resin comprises a hydroxyl group, the second thermal-crosslinking agent comprises a second group capable of reacting with the hydroxyl group of the second resin, and a ratio of equivalent number of the second group of the second thermal-crosslinking agent to equivalent number of the hydroxyl group of the second resin is represented by r2, wherein r1<r2≤0.8 and r2−r1≥0.025.

2. The double-sided optically clear adhesive as claimed in claim 1, wherein the first resin and the second resin have a monomer composition comprising a hydroxyl group-containing monomer, a hydroxyl group-free hydrophilic monomer, and a (meth)acrylic acid alkyl ester monomer.

3. The double-sided optically clear adhesive as claimed in claim 2, wherein alkyl groups in the (meth)acrylic acid alkyl ester monomer have a carbon number which is greater than or equal to 3 and less than or equal to 12.

4. The double-sided optically clear adhesive as claimed in claim 2, wherein the monomer composition comprises 1 to 10 parts by weight of the hydroxyl group-containing monomer, 1 to 20 parts by weight of the hydroxyl group-free hydrophilic monomer, and 75 to 95 parts by weight of the (meth)acrylic acid alkyl ester monomer.

5. The double-sided optically clear adhesive as claimed in claim 2, wherein the hydroxyl group-containing monomer comprises acrylic acid, hydroxyethyl (meth)acrylate, hydroxypropyl (meth)acrylate, or hydroxybutyl (meth)acrylate.

6. The double-sided optically clear adhesive as claimed in claim 2, wherein the hydroxyl group-free hydrophilic monomer comprises acrylonitrile, acrylamide, acryloyl morpholine, or N-vinyl-2-pyrrolidone.

7. The double-sided optically clear adhesive as claimed in claim 1, wherein the first resin and the second resin have the same monomer composition.

8. The double-sided optically clear adhesive as claimed in claim 1, wherein the first resin and the second resin have different monomer compositions.

9. The double-sided optically clear adhesive as claimed in claim 1, wherein the first group and the second group comprise isocyanate groups, carboxyl groups, aziridine groups, anhydride groups, or melamine groups.

10. A multilayer structure, comprising:
a first substrate;
a second substrate; and
the double-sided optically clear adhesive as claimed in claim 1, wherein the first adhesive layer has a first surface, the second adhesive layer has a second surface, the first surface is in contact with the first substrate, and the second surface is in contact with the second substrate.

11. The multilayer structure as claimed in claim 10, wherein the first substrate comprises a panel.

12. The multilayer structure as claimed in claim 11, wherein the panel comprises transparent glass or a transparent substrate, and at least one surface of the transparent glass or the transparent substrate comprises transparent conductive electrodes.

13. The multilayer structure as claimed in claim 11, wherein the second substrate comprises a polarizer.

* * * * *